United States Patent
Gupta et al.

(10) Patent No.: US 9,348,816 B2
(45) Date of Patent: May 24, 2016

(54) DIALOG COHERENCE USING SEMANTIC FEATURES

(75) Inventors: Rakesh Gupta, Moutain View, CA (US); Lev-Arie Ratinov, Champaign, IL (US)

(73) Assignee: Honda Motor Co., Ltd., Tokyo (JP)

( * ) Notice: Subject to any disclaimer, the term of this patent is extended or adjusted under 35 U.S.C. 154(b) by 1386 days.

(21) Appl. No.: 12/579,251

(22) Filed: Oct. 14, 2009

(65) Prior Publication Data

US 2010/0217592 A1    Aug. 26, 2010

Related U.S. Application Data

(60) Provisional application No. 61/196,056, filed on Oct. 14, 2008.

(51) Int. Cl.
 *G01L 15/00*   (2006.01)
 *G06F 17/27*   (2006.01)

(52) U.S. Cl.
 CPC ................... *G06F 17/279* (2013.01)

(58) Field of Classification Search
 CPC ... G10L 15/183; G10L 15/1815; G10L 15/04; G10L 15/18
 USPC ........................ 704/8, 9, 275, 257, 244, 243
 See application file for complete search history.

(56) References Cited

U.S. PATENT DOCUMENTS

| | | | |
|---|---|---|---|
| 6,622,119 B1 | 9/2003 | Ramaswamy et al. | |
| 6,879,956 B1 | 4/2005 | Honda et al. | |
| 6,941,266 B1 | 9/2005 | Gorin et al. | |
| 7,167,824 B2 | 1/2007 | Kallulli | |
| 7,516,076 B2 * | 4/2009 | Walker et al. | 704/275 |
| 7,574,362 B2 * | 8/2009 | Walker et al. | 704/275 |
| 7,912,720 B1 * | 3/2011 | Hakkani-Tur et al. | 704/270 |
| 7,933,774 B1 * | 4/2011 | Begeja et al. | 704/243 |

(Continued)

FOREIGN PATENT DOCUMENTS

WO    WO 2007/005184 A2    1/2007

OTHER PUBLICATIONS

Barzilay, R. et al., "Modeling Local Coherence: An Entity-Based Approach," In ACL '05: Proceedings of the 43rd Annual Meeting on Association for Computational Linguistics, Association for Computational Linguistics, Jun. 2005, pp. 141-148, Morristown, New Jersey, USA.

(Continued)

*Primary Examiner* — Richemond Dorvil
*Assistant Examiner* — Mark Villena
(74) *Attorney, Agent, or Firm* — Arent Fox LLP (57) ABSTRACT

The present invention provides a method for identifying a turn, such as a sentence or phrase, for addition to a platform dialog comprising a plurality of turns. Lexical features of each of a set of candidate turns relative to one or more turns in the platform dialog are determined. Semantic features associated with each candidate turn and associated with the platform dialog are determined to identify one or more topics associated with each candidate turn and with the platform dialog. Lexical features of each candidate turn are compared to lexical features of the platform dialog and semantic features associated with each candidate turn are compared to semantic features of the platform dialog to rank the candidate turns based on similarity of lexical features and semantic features of each candidate turn to lexical features and semantic features of the platform dialog.

30 Claims, 6 Drawing Sheets

(56) References Cited

U.S. PATENT DOCUMENTS

| | | | |
|---|---|---|---|
| 8,396,715 B2 * | 3/2013 | Odell et al. | 704/270 |
| 2004/0098245 A1 * | 5/2004 | Walker et al. | 704/1 |
| 2005/0182618 A1 * | 8/2005 | Azara et al. | 704/9 |
| 2005/0278180 A1 * | 12/2005 | O'Neill et al. | 704/275 |
| 2005/0286705 A1 * | 12/2005 | Contolini et al. | 379/265.02 |
| 2006/0129409 A1 * | 6/2006 | Mizutani et al. | 704/275 |
| 2006/0195320 A1 | 8/2006 | Carpenter | |
| 2006/0271353 A1 * | 11/2006 | Berkan et al. | 704/9 |
| 2006/0293886 A1 * | 12/2006 | Odell et al. | 704/231 |
| 2007/0033526 A1 * | 2/2007 | Thompson et al. | 715/708 |
| 2007/0055491 A1 | 3/2007 | Manson et al. | |
| 2008/0004881 A1 * | 1/2008 | Attwater et al. | 704/275 |
| 2008/0215320 A1 * | 9/2008 | Wu et al. | 704/231 |
| 2008/0306899 A1 * | 12/2008 | Gregory et al. | 707/1 |
| 2009/0287678 A1 * | 11/2009 | Brown et al. | 707/5 |

OTHER PUBLICATIONS

Budanitsky, A. et al., "Evaluating WordNet-Based Measures of Lexical Semantic Relatedness," Association of Computational Linguistics, 2006, vol. 32, No. 1, pp. 13-47.

Burstein, J. et al., "Finding the Write Stuff: Automatic Identification of Discourse Structure in Student Essays," IEEE Intelligent Systems, Jan./Feb. 2003, vol. 18, No. 1, pp. 32-39.

Cieri, C. et al., "The Fisher Corpus: A Resource for the Next Generations of Speech-to-Text," In Proceedings of 4th International Conference on Language Resources and Evaluation, May 2004, 3 pages.

Elsner, M. et al., "You Talking to Me? A Corpus and Algorithm for Conversation Disentanglement," In Proceedings of ACL-08: HLT, Association for Computational Linguistics, Jun. 2008, pp. 834-842, Columbus, Ohio, USA.

Foltz, P. et al., "Textual Coherence Using Latent Semantic Analysis," Discourse Processes, 1998, vol. 25 (2&3), pp. 285-307.

Gabrilovich, E. et al., "Computing Semantic Relatedness Using Wikipedia-Based Explicit Semantic Analysis," In Proceedings of International Joint Conference on Artificial Intelligence (IJCAI), Jan. 2007, pp. 1606-1611.

Godfrey, J. et al.,"Switchboard: Telephone Speech Corpus for Research and Development," In IEEE International Conference on Acoustics, Speech, and Signal Processing (ICASSP), Mar. 23-26, 1992, vol. 1, pp. 517-520.

Grosz, B. et al., "Centering: A Framework for Modeling the Local Coherence of Discourse," Association of Computational Linguistics, 1995, vol. 21, No. 2, pp. 203-225.

Gupta, R. et al., "Common Sense Data Acquisition for Indoor Mobile Robots," In Nineteenth National Conference on Artificial Intelligence (AAAI-04), Jul. 25-29, 2004, San Jose, California, USA.

Hirschberg, J. et al., "Empirical Studies on the Disambiguation of Cue Phrases," Association of Computational Linguistics, 1993, vol. 19, No. 3, pp. 501-530.

Jurafsky, D. et al., "Automatic Detection of Discourse Structure for Speech Recognition and Understanding," In IEEE Workshop on Automatic Speech Recognition and Understanding, Dec. 1997, pp. 88-95.

Koit, M. et al., "Generating Natural Language Text in a Dialog System," Proceeding of COLING 86, Bonn 1986, pp. 576-580.

Marcu, D. et al., "An Unsupervised Approach to Recognizing Discourse Relations," In ACL '02: Proceedings of the 40th Annual Meeting on Association for Computational Linguistics, Association for Computational Linguistics, 2002, pp. 368-375, Morristown, New Jersey, USA.

Pantel, P., "Clustering by Committee," Doctor of Philosophy Thesis, Adviser: Dekang Lin, University of Alberta, Spring 2003, Edmonton, Alberta, Canada.

PCT International Search Report and Written Opinion, PCT Application No. PCT/US2009/060700, Dec. 2, 2009, 6 pages.

Purandare, A. et al., "Analyzing Dialog Coherence Using Transition Patterns in Lexical and Semantic Features," Association for the Advancement of Artificial Intelligence, 2008, 6 pages.

* cited by examiner

DIALOG COHERENCE USING SEMANTIC FEATURES

RELATED APPLICATIONS

This application claims priority, under 35 U.S.C. §119(e), from U.S. provisional application No. 61/196,056, filed on Oct. 14, 2008, which is incorporated by reference herein in its entirety.

FIELD OF THE INVENTION

This invention relates generally to dialog prediction, and more particularly to using semantic features in predicting turns, or phrases, for continuing a dialog.

BACKGROUND OF THE INVENTION

Accurate prediction of turns, such as phrases or sentences, in a dialog between two entities, improves dialog generation, machine translation of dialogs and speech recognition. For example, an automated agent, such as a mobile robot, may perform one or more complex tasks where the automated agent is engaged in conversation with a human and has several options for responding to the human. Dialog prediction allows the automated agent to choose the best response option based on the conversation history. Additionally, a machine translation of a dialog that fails to account for dialog context leads to incoherent output. Further, the accuracy of a speech recognition system is improved when the speech recognition system has contextual knowledge of an upcoming utterance to expect.

However, dialogs where two entities exchange information, such as phrases or sentences, are generally impromptu and have minimal explicit structure. While conventional techniques allow prediction of subsequent phrases or terms in a monologue, these techniques generally rely on determining global coherence for the monologue in its entirety using lexical techniques or segmenting the monologue into topics using text-tiling. However, the minimal structure of a dialog impairs the effectiveness of these conventional techniques.

Inclusion of a turn, such as a phrase or a sentence, in a dialog affects the coherence of the dialog. Conventional analysis of dialog coherence focuses on local coherence between adjacent turns, such as sentences or phrases, or within a turn. While coherence of a monologue in its entirety can be determined, the reduced structure of a dialog prevents use of techniques for determining monologue coherence in dialog prediction. This inability of conventional methods to account for overall dialog coherence further impairs prediction of turns, such as sentences or phrases, used in a dialog.

Hence, there is a need for a system or method for predicting a turn for addition to an existing dialog while maintaining coherence with the existing dialog.

SUMMARY OF THE INVENTION

The present invention provides a system and method for identifying a turn, such as a sentence or phrase, for addition to a platform dialog comprising a plurality of turns. A set of candidate turns are generated, for example, from one or more stored dialogs and lexical features of each candidate turn relative to one or more turns in the platform dialog are determined. Semantic features are determined for each candidate turn to identify one or more topics associated with each candidate turn and semantic features are also determined for the platform dialog to identify one or more topics associated with the platform dialog. Lexical features of each candidate turn are compared to lexical features of the platform dialog and semantic features associated with each candidate turn are compared to semantic features of the platform dialog to rank the candidate turns based on the similarity of lexical features and semantic features of each candidate turn to lexical features and semantic features of the platform. The candidate turn having a highest ranking is predicted for dialog continuation.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the Figures where like reference numbers indicate identical or functionally similar elements. Also in the Figures, the left most digits of each reference number correspond to the Figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Figure 1:
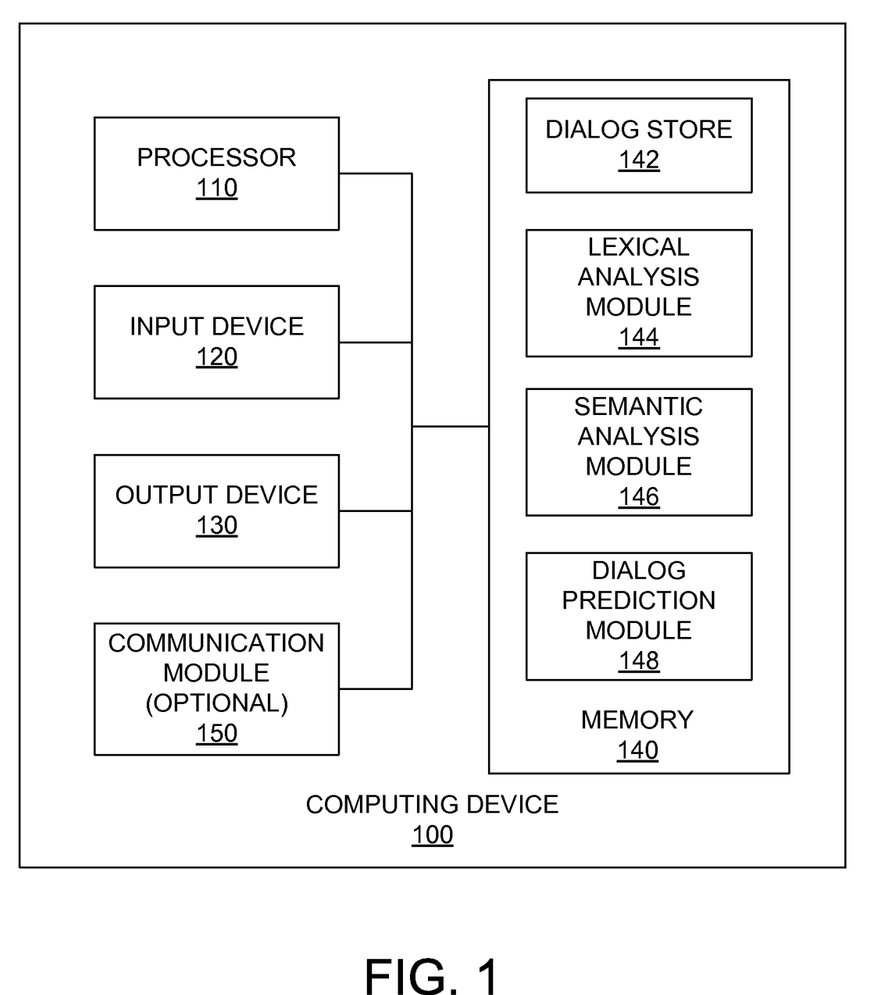
FIG. 1 is an illustration of a computing system in which one embodiment of the present invention operates.

FIG. 1 is an illustration of a computing system 100 in which one embodiment of the present invention may operate. The computing system 100 comprises a processor 110, an input device 120, an output device 130 and a memory 140. In an embodiment, the computing system 100 further comprises a communication module 150 including transceivers or connectors.

The processor 110 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processor 110 comprises an arithmetic logic unit, a microprocessor, a general purpose computer, or some other information appliance equipped to transmit, receive and process electronic data signals from the memory 140, the input device 120, the output device 130 or the communication module 150.

The input device 120 is any device configured to provide user input to the computing system 100, such as a cursor controller or a keyboard. In one embodiment, the input device 120 can include an alphanumeric input device, such as a QWERTY keyboard, a key pad or representations of such created on a touch screen, adapted to communicate information and/or command selections to processor 110 or memory 140. In another embodiment, the input device 120 is a user input device equipped to communicate positional data as well as command selections to processor 110 such as a joystick, a mouse, a trackball, a stylus, a pen, a touch screen, cursor direction keys or other mechanisms to cause movement adjustment of an image.

The output device 130 represents any device equipped to display electronic images and data as described herein. Output device 130 may be, for example, an organic light emitting diode display (OLED), liquid crystal display (LCD), cathode ray tube (CRT) display, or any other similarly equipped display device, screen or monitor. In one embodiment, output device 120 is equipped with a touch screen in which a touch-sensitive, transparent panel covers the screen of output device 130.

The memory 140 stores instructions and/or data that may be executed by processor 110. The instructions and/or data may comprise code for performing any and/or all of the techniques described herein. Memory 140 may be a dynamic random access memory (DRAM) device, a static random access memory (SRAM) device, Flash RAM or another non-volatile storage device, combinations of the above, or some other memory device known in the art. The memory 140 is adapted to communicate with the processor 110, the input device 120, the output device 130 and/or the communication module 150. In one embodiment, the memory comprises a dialog store 142, a lexical analysis module 144, a semantic analysis module 146 and a dialog prediction module 148.

The dialog store 142 includes one or more dialogs, each including a plurality of turns, such as sentences or phrases, exchanged between two or more entities. For example, the dialog store 142 includes a dialog between a first person and a second person, where various portions of the dialog contributed by the first person comprise different turns and various portions of the dialog contributed by the second person comprise additional turns. In one embodiment, the dialog store 142 includes transcripts of phone conversations covering many topics, such as the Fischer corpus described in "The Fisher Corpus: A Resource for the Next Generations of Speech-to-Text," by C. Ceri et al. in Proceedings of $4^{th}$ International Conference on Language Resources and Evaluation, May 2004, which is incorporated by reference herein in its entirety, or a similar corpus including data from two or more entities associated with one or more topics.

In an embodiment, the dialog store 142 also includes data or instructions for manipulating one or more of the stored dialogs. For example, the dialog store 142 discards turns from a dialog which have a number of words less than a threshold, such as twenty words or fifteen words. Imposing a minimum number of words on turns allows the dialog store 142 to eliminate turns providing minimal semantic information, such as turns showing interest or attention while another entity is communicating. For example, a turn comprising the words "Right . . . right, yeah" is removed by the dialog store 142, as the turn does not significantly affect coherence of the complete dialog. Additionally, the dialog store 142 includes data or instructions for selecting a plurality of candidate turns from one or more stored dialogs from which a turn is selected for inclusion in a dialog. For example, the dialog store includes a current dialog to which a candidate turn is to be added, referred to herein as the "platform" or "platform dialog," and one or more stored dialogs from which a plurality of candidate turns are selected and evaluated for inclusion in the platform dialog.

Additionally, the dialog store 142 includes labeled text data describing one or more topics organized into a plurality of datasets or categories. In an embodiment, the dialog store 142 includes one or more labeled datasets having text data organized into one or more categories and/or sub-categories. For example, the dialog store 142 includes a plurality of question and answer pairs organized into categories based on title, content or other characteristics of the question and answer pairs. Examples of labeled datasets include "YAHOO® Answers," the "Open Directory Project," Wikipedia or other collections of data partitioned into one or more categories and/or subcategories. Including additional data, such as labeled datasets, in the dialog store 142 provides additional information identifying topics or concepts in the platform dialog or in one or more stored dialogs.

The lexical analysis module 144 includes information describing extraction of lexical features from a candidate turn and from the platform dialog. As used herein, "candidate turn" refers to a turn being analyzed for inclusion in the platform dialog by the lexical analysis module 144. Lexical overlap features, such as tokens, stemmed tokens, bigrams and stemmed bigrams are extracted from the candidate turn and from the platform dialog. Additionally, platform suffixes of different lengths are analyzed and lexical overlap features for the most recent turn in the platform dialog and for earlier turns in the platform dialog are generated. The lexical analysis module 144 also extracts transition features from the most recent turn in the platform dialog and from the candidate turn. Given a first turn, $s_1$, having features $(w_1, w_2, \ldots w_N)$ and a second turn, $s_2$, having features $(v_1, v_2 \ldots v_M)$, the transition features comprise bigrams of the form $(w_i, v_j)$, so that M×N transition features are generated from turns $s_1$ and $s_2$. Transition features allow identification of one or more incoherence points between the first turn and the second turn. One embodiment of operation of the lexical analysis module is further described below in conjunction with FIG. 3.

The semantic analysis module 146 extracts one or more semantic features from one or more candidate turns and the platform dialog. Semantic features describe one or more topics or concepts representing the subject matter of the candidate turn and/or the subject matter of the platform dialog. Extracting semantic features allows the semantic analysis module 146 to determine whether a candidate turn relates to the same subject matter, or relates to similar subject matter, as the platform dialog. In an embodiment, the semantic analysis module 146 extracts evocation features, such as evocation degree, from one or more candidate turns and the platform dialog. In a coherent dialog, a reference to a first concept generally evokes a response referencing a related concept, so the evocation degree identifies whether a second expression can be evoked from a first expression. In an embodiment, evocation relations are generated from labeled datasets included in the dialog store 142, or from labeled datasets accessible by the communication module 150, and the evocation relations determine the evocation degree of a candidate turn relative to the platform dialog. For example, the evocation degree of a candidate turn relative to the most recent turn in the platform is calculated as the percentage of words in the candidate turn that can be evoked from a word in the most recent turn in the platform. An embodiment of extraction of evocation features is further described below in conjunction with FIG. 4.

In an embodiment, the semantic analysis module 146 performs concept vector analysis to associate one or more topics or concepts with a candidate turn and with a platform dialog. For example, the semantic analysis module 146 generates a concept vector associated with the candidate turn and a concept vector associated with the platform dialog in a vector space and measures the similarity of the concept vector associated with the candidate turn and the concept vector associated with the platform dialog. One or more labeled datasets included in the dialog store 142, or accessible via the communication module 150, generate a vector space from which the concept vectors are generated and used to determine similarity between the candidate turn and the platform dialog. By measuring similarity in a vector space, the semantic analysis module 146 identifies a candidate turn which is coherent with the platform dialog even when the platform dialog and candidate turn do not share lexical concepts or entities. In an embodiment, the platform dialog is interpreted in its entirety by the semantic analysis module 146 to improve the accuracy of the concept vector associated with the platform dialog. An embodiment of concept vector analysis of a platform dialog and a candidate turn is further described below in conjunction with FIG. 5.

In an embodiment, the semantic analysis module 146 both extracts evocation features and performs concept vector analysis to provide a wider range of semantic features used to select a candidate turn. Alternatively, the semantic analysis module 146 extracts evocation features or performs concept vector analysis.

The dialog prediction module 148 receives lexical features from the lexical analysis module 144 and receives semantic features from the semantic analysis module 146. In an embodiment, the dialog prediction module 148 also receives the platform dialog and one or more candidate turns from the dialog store 142. According to one embodiment, the dialog prediction module 148 includes a classifier assigning a degree of relevance to each candidate turn in the context of the platform dialog. The dialog prediction module 148 then selects the candidate turn having the maximum degree of relevance.

Alternatively, the dialog prediction module 148 ranks the one or more candidate turns received from the dialog store 142 using a function, $\phi(p, t_i)$, which extracts features capturing the lexical and semantic relatedness of the platform dialog, p, and the candidate turn, received from the lexical analysis module 144 and the semantic analysis module 146, respectively, and a weight vector, w. The function and weight vector are used to implement a linear ranker, r, comparing different candidate turns, $t_i$ and $t_j$, as follows:

$$r(t_i,t_j,p)=w\cdot\phi(p,t_i)-w\cdot\phi(p,t_j)$$

For candidate turns $t_i$ and $t_j$, if $r(t_i, t_j, p) \geq 0$, the dialog prediction module 148 determines that $t_i$ is better suited for inclusion in the platform dialog than $t_j$. In an embodiment, the weight vector, w, is updated as candidate turns are evaluated using the perceptron update rule. To update the weight vector, a modification factor, $y_{ij}$, is calculated so that $y_{ij}=1$ if $t_i$ is better suited for inclusion in the platform and $y_{ij}=-1$ if $t_j$ is better suited for inclusion in the platform. Thus, if the product of the linear ranker result and the modification factor is below a threshold value, $\Theta$, the weight vector is updated as follows:

$$w=w+\gamma\cdot y_{ij}[\phi(p,t_i)-\phi(p,t_j)]$$

Where $\gamma$ is the learning rate and $\Theta$ is the thick separator margin for regularization. Hence, the dialog prediction module 148 ranks a plurality of candidate turns to identify the candidate turn best suited for inclusion in the platform dialog based on the lexical features and semantic features of the candidate turns.

In an embodiment, the computing system 100 further comprises a communication module 150 which links the computing system 100 to a network (not shown), or to other computing systems 100. The network may comprise a local area network (LAN), a wide area network (WAN) (e.g. the Internet), and/or any other interconnected data path across which multiple devices man communicate. In one embodiment, the communication module 150 is a conventional connection, such as USB, IEEE 1394 or Ethernet, to other computing systems 100 for distribution of files and information. In another embodiment, the communication module 150 is a conventional type of transceiver, such as for infrared communication, IEEE 802.11a/b/g/n (or WiFi) communication, Bluetooth® communication, 3G communication, IEEE 802.16 (or WiMax) communication, or radio frequency communication.

It should be apparent to one skilled in the art that the computing system 100 may include more or less components than those shown in FIG. 1 without departing from the spirit and scope of the present invention. For example, the computing system 100 may include additional memory, such as, for example, a first or second level cache, or one or more application specific integrated circuits (ASICs). Similarly, the computing system 100 may include additional input or output devices. In some embodiments of the present invention one or more of the components (110, 120, 130, 140, 142, 144, 146, 148) can be positioned in close proximity to each other while in other embodiments these components can be positioned in geographically distant locations. For example the units in memory 140 can be programs capable of being executed by one or more processors 110 located in separate computing systems 100.

Figure 2:
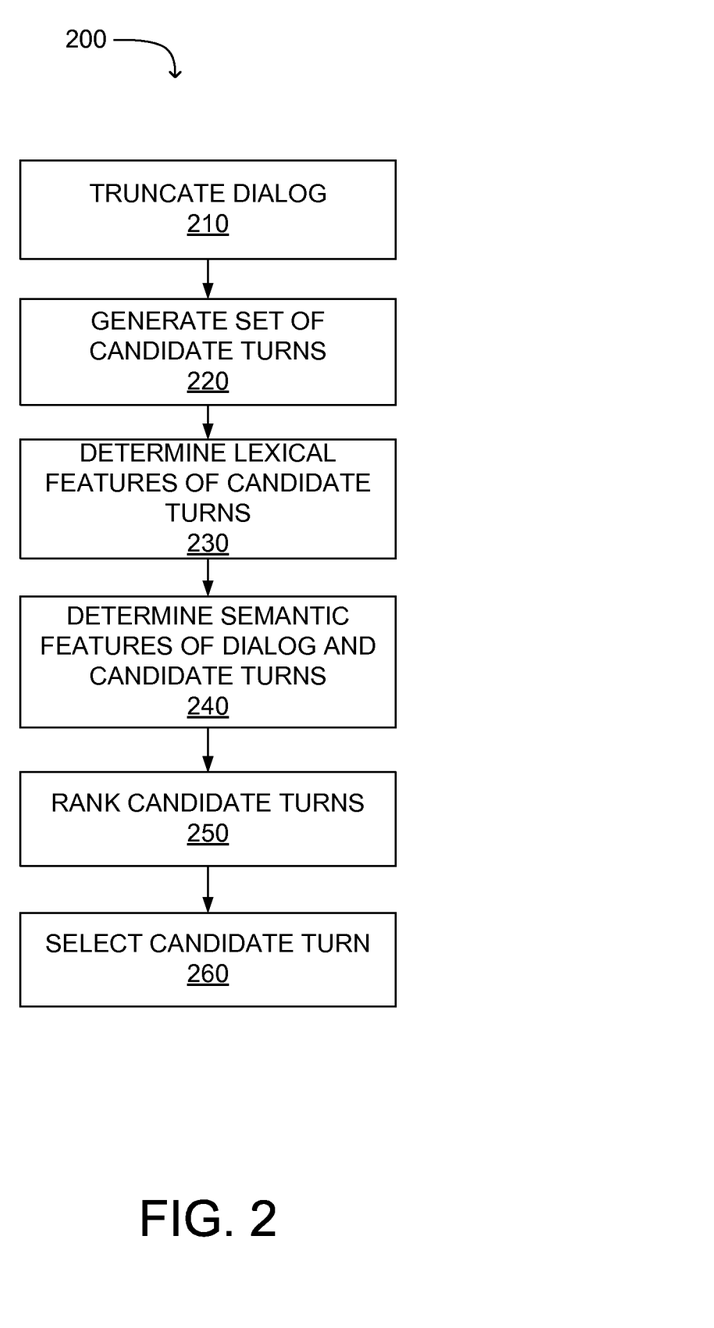
FIG. 2 is a flowchart illustrating a method for selecting a turn for continuing a platform dialog according to an embodiment of the present invention.

FIG. 2 is a flowchart illustrating a method 200 for selecting a turn for addition to a platform dialog according to an embodiment of the present invention. In an embodiment, the steps depicted in the method 200 shown in FIG. 2 are implemented by instructions for performing the described actions embodied or stored within a computer readable medium, e.g., memory 140, which are executable by a processor 110. Those of skill in the art will recognize that the method 200 may be implemented in embodiments of hardware and/or software or combinations thereof. Moreover, other embodiments can include different and/or additional steps than the ones shown in FIG. 2.

In one embodiment, the dialog store 142 initially truncates 210 one or more stored dialogs by discarding turns having a number of words less than a threshold, such as twenty words or fifteen words, from the one or more stored dialogs. Removing turns having less than a minimum number of words removes turns providing minimal semantic information, such as turns merely showing interest or attention while another entity is communicating, which reduces the data being analyzed without impairing dialog coherence. For example, a dialog is truncated 210 by removing turns such as "mm, yes, exactly" or "right . . . yeah, right," as these turns are "backchannels" which merely show attention or a willingness to keep listening.

After truncating 210 the one or more stored dialogs, a set of candidate turns is generated 220 by retrieving a plurality of candidate turns from one or more truncated dialogs. In one embodiment, the dialog prediction module 148 includes one or more parameters for generating 220 the set of candidate turns from the dialog store 142. Alternatively, the dialog store 142 includes instructions and/or commands for generating 220 the set of candidate turns from one or more stored dialogs. In one embodiment, turns are retrieved from the platform dialog, which is the current dialog being analyzed, and from one or more additional stored dialogs.

One or more lexical features of each candidate turn in the set of candidate turns are determined 230 by the lexical analysis module 144. In an embodiment, the lexical analysis module 144 determines 230 two types of lexical features, lexical overlap features and transition features, associated with each of the candidate turns and associated with the platform dialog. The lexical analysis module determines 230 the percentage of lexical features in a candidate turn also appearing in the platform dialog. By determining 230 lexical overlap features, the lexical analysis module 144 evaluates the similarity of a candidate turn to one or more turns in the platform, while determining 230 transition features of a candidate turn allows the lexical analysis module 144 to identify one or more incoherence points between the candidate turn and one or more turns in the platform. One embodiment of determination of lexical features of the candidate turns is further described below in conjunction with FIG. 3.

The semantic analysis module 146 determines 240 one or more semantic features describing one or more concepts or topics associated with a candidate turn and associated with the platform dialog. In an embodiment, the semantic analysis module 146 determines 240 evocation features, such as evocation degree, from one or more candidate turns and the platform dialog. Evocation features describe relationships between a first topic in the platform dialog and a second, related topic. For example, the semantic analysis module 146 determines the percentage of words in the candidate turn that can be evoked from one or more words in a turn from the platform dialog. One embodiment of determination of one or more evocation features from one or more candidate turns and the platform dialog is further described below in conjunction with FIG. 4.

Alternatively, the semantic analysis module 146 performs concept vector analysis to determine 240 one or more semantic relationships describing a set of topics, or concepts, associated with the platform dialog and associated with a candidate turn using a vector space. For example, a concept vector space is generated from labeled data included in the dialog store 142, or accessed using the communication module 150, such as one or more labeled datasets having text data organized into one or more categories and/or sub-categories. In an embodiment, one or more labeled datasets are used to associate one or more topics with the platform dialog and with the candidate turn. The topics, or concepts, associated with the platform dialog and the topics, or concepts, associated with the candidate turn are used to determine the similarity of the subject matter of the candidate turn and of the platform dialog. One embodiment of determining 240 semantic features of a platform dialog and of a candidate turn using concept vectors is further described below in conjunction with FIG. 5.

In an embodiment, the lexical analysis module 144 determines 230 one or more lexical features of each candidate turn in the set of candidate turns and the semantic analysis module 146 determines 240 a set of topics, or concepts, associated with the platform dialog and a set of candidate topics, or concepts, associated with a candidate turn in a vector space. This allows use of both lexical features and semantic features to select a candidate turn for inclusion in the platform dialog. Additionally, in an embodiment, the semantic analysis module 146 determines 240 semantic features of the platform dialog and one or more candidate turns using evocation features and concept vector analysis. Using semantic features in addition to lexical features, increases the likelihood of identifying a candidate turn that maintains the coherence of the platform dialog when added to the platform dialog.

The lexical features and/or semantic features of the one or more candidate turns and the platform dialog are communicated to the dialog prediction module 148 which ranks 250 the set of candidate turns using the lexical features and/or semantic features of each candidate turn. In one embodiment, the dialog prediction module 148 generates a function, $\phi(p, t_i)$, describing the lexical features and/or semantic features of the platform dialog, p, and the candidate turn, $t_i$, received from the lexical analysis module 144 and the semantic analysis module 146, respectively, and a weight vector, w. Hence, the generated function includes information describing the lexical and/or semantic relationship between a candidate turn, $t_i$, and the platform dialog. Using the function and weight vector, the dialog prediction module 148, in one embodiment, implements a linear ranker, r, comparing different candidate turns, $t_i$ and $t_j$, using:

$$r(t_i,t_j,p)=w\cdot\phi(p,t_i)-w\cdot\phi(p,t_j)$$

For two candidate turns in the set of candidate turns, $t_i$ and $t_j$, if $r(t_i, t_j, p) \geq 0$, the dialog prediction module 148 determines that $t_i$ is better suited for inclusion in the platform dialog than $t_j$.

In an embodiment, the weight vector, w, is updated as candidate turns are evaluated using the perceptron update rule. To update the weight vector, w, a modification factor, $y_{ij}$, is calculated so that $y_{ij}=1$ if $t_i$ is better suited for inclusion in the platform and $y_{ij}=-1$ if $t_j$ is better suited for inclusion in the platform. Thus, if the product of the linear ranker result and the modification factor is below a threshold value, $\Theta$, the weight vector is updated as follows:

$$w=w+\gamma\cdot y_{ij}[\phi(p,t_i)-\phi(p,t_j)]$$

Where $\gamma$ is the learning rate and $\Theta$ is the thick separator margin for regularization. Hence, the dialog prediction module 148 ranks 250 a plurality of candidate turns and selects 260 the candidate turn from the set of candidate turns having the highest ranking for inclusion in the platform dialog based on the lexical features and semantic features of the candidate turns. For example, the dialog prediction module 148 compares each candidate turn with the other candidate turns in the candidate turn set and associates a comparison metric with each candidate turn. The candidate turn having the largest comparison metric is selected 260 for inclusion in the platform dialog to maintain the coherence of the platform dialog after addition of the candidate turn.

Figure 3:
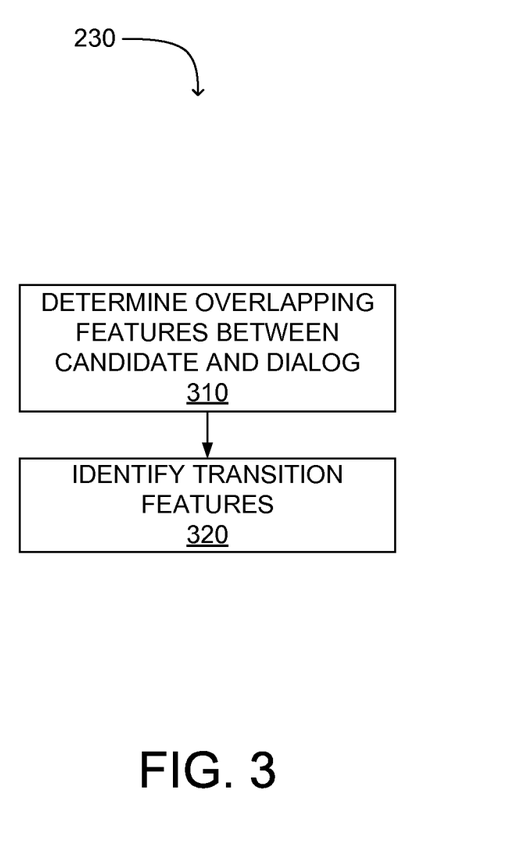
FIG. 3 is a flowchart of a method for determining lexical features of one or more candidate turns for continuing a platform dialog according to an embodiment of the present invention.

FIG. 3 is a flowchart of a method for determining 230 lexical features of one or more candidate turns for continuing a platform dialog according to an embodiment of the present invention. In an embodiment, the steps depicted in the method shown in FIG. 3 are implemented by instructions for performing the described actions embodied or stored within a computer readable medium, e.g., memory 140, which are executable by a processor 110. Those of skill in the art will recognize that the method may be implemented in embodiments of hardware and/or software or combinations thereof. Moreover, other embodiments can include different and/or additional steps than the ones shown in FIG. 3.

In an embodiment, the lexical analysis module 144 determines 310 lexical overlap features and identifies 320 transition features to quantify how similar a candidate turn is to one or more turns in the platform dialog. By determining 310 lexical overlap features between a candidate turn and the platform dialog, the lexical analysis module 144 measures the percentage of words comprising the candidate turn also appearing in the platform dialog. Past turns in the platform dialog influence the words comprising the most recent turn in the platform dialog and comprising the candidate turn that maintains dialog coherence, with more recent turns being more relevant to word selection in the candidate turn. Because the relevance of a turn in the platform dialog to a candidate turn is inversely proportional to the temporal difference between the candidate turn and the platform turn, platform suffixes of different lengths are determined from the platform dialog by the lexical analysis module 144. In one embodiment, the lexical analysis module 144 determines platform suffixes by extracting features, such as tokens, stemmed tokens, bigrams and stemmed bigrams, from one or more turns in the platform dialog. For example, the lexical analysis module 144 determines 310 lexical overlap features for a predetermined number of turns in the platform dialog, such as the most recent K turns in the platform dialog to obtain lexical overlap features from the platform turns most likely to affect the candidate turn.

To determine 310 overlapping lexical features between the candidate turn and the platform dialog, after extracting features, such as tokens, stemmed tokens, bigrams and stemmed bigrams, from one or more turns in the platform dialog, the lexical analysis module 144 extracts features, such as tokens, stemmed tokens, bigrams and stemmed bigrams, from the candidate turn. For example, the lexical analysis module 144 determines the percentage of features extracted from the candidate turn that were also extracted from one or more turns in the platform dialog. As another example, the lexical analysis module 144 determines the percentage of bigrams in the candidate turn that also appear within one or more turns in the platform dialog. In an embodiment, the temporal proximity of a turn from the platform dialog to the candidate turn is used to weight the influence of the turn from the platform dialog so that turns from the platform dialog occurring closer in time to the candidate turn have more influence. Because a dialog is generally less coherent than a monologue, determining 310 the percentage of lexical features overlapping between the candidate turn and the platform dialog provides an accurate measure of similarity between the candidate turn and the platform dialog.

The lexical analysis module 144 also identifies 320 one or more transition features to determine discourse relations between the candidate turn and one or more turns in the platform dialog. Use of transition features to identify discourse relations between sentences and to predict dialog coherence is described in "An Unsupervised Approach to Recognizing Discourse Relations," by D. Marcu et al. in ACL 2002: Proceedings of the 40$^{th}$ Annual Meeting on Association for Computational Linguistics, pages 368-375, and in "Analyzing Dialog Coherence Using Transition Patterns in Lexical and Semantic Features," by A. Purandare et al. in Proceedings of the 21$^{st}$ International FLAIRS Conference, 2008, which are both incorporated by reference herein in their entirety. Given a first turn, $s_1$, with a plurality of features $w_1, w_2 \ldots w_N$, and a second turn, $s_2$, with a plurality of features, $v_1, v_2 \ldots v_N$, transition features are bigrams of the form $(w_i, v_j)$, which pair a feature from the first turn with a feature from the second turn. In the example above, a total of M×N transition features are generated from turns $s_1$ and $s_2$. Identifying 320 one or more transition features allows the lexical analysis module 144 to discern one or more incoherence points between turns. For example, an appropriate response to the turn "Hi, my name is Rocky" would include words such as "Hi," "Hello," "my," or "name," so identifying 320 a transition feature of the form (Hi, Hello) indicates a coherent discourse structure. In contrast, identifying 320 a transition feature such as (What, Yes) captures an incoherence point where a question associated with a narrative answer, a "wh-question" is answered with a yes answer.

In an embodiment, the lexical analysis module 144 prunes the identified transition features to reduce the amount of features or identifies a specific set of transition features. For example, function words and cue phrases, such as "what," "is," "like," "yes" or similar phrases, are identified in the candidate turn and one or more turns in the platform dialog. In an embodiment, the function words are identified by data stored in the lexical analysis module 144, such as a stop-word list from document classification and the cue phrases are identified from a stored listing of phrases, such as the listing described in "Empirical Studies on the Disambiguation of Cue Phrases," by J. Hirshberg et al. in Computational Linguistics, 19:501-530 (1993), which is hereby incorporated by reference in its entirety. To additionally limit the number of transition features identified, the lexical analysis module 144 extracts transition features from a subset of words in each turn, such as the first six words in each turn. Additionally, in an embodiment, the lexical analysis module 144 determines transition features of the candidate turn and the most recent turn from the platform dialog and the next most recent turn from the platform dialog, so transition features from the candidate turn are paired with transition features from the two most recent turns in the platform dialog.

Figure 4:
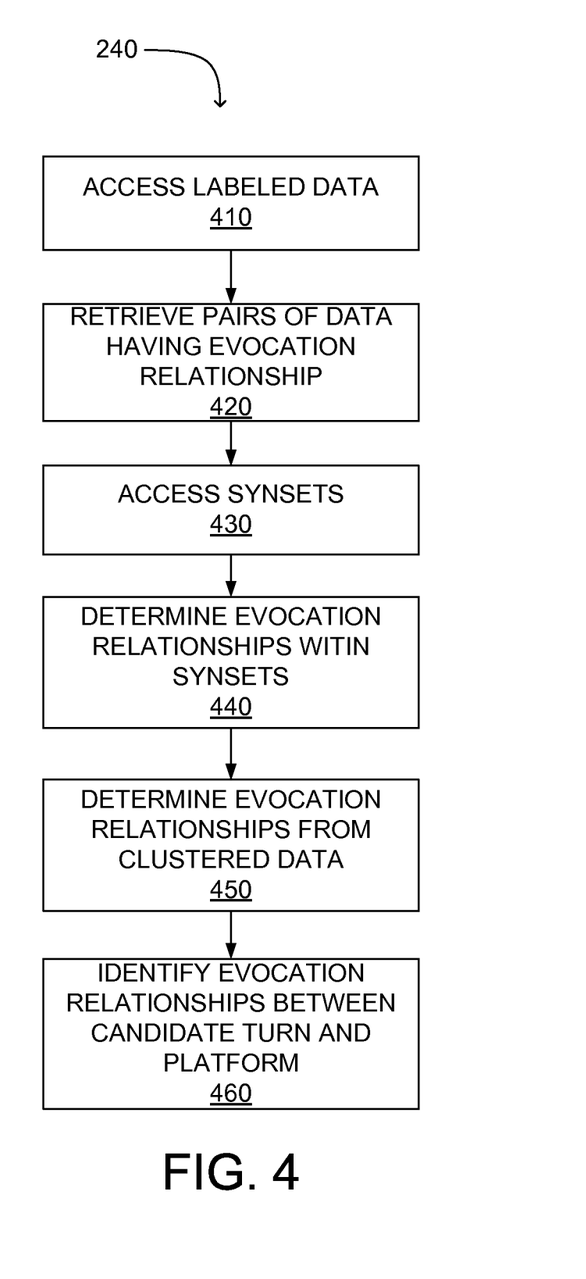
FIG. 4 is a flowchart of a method for using evocation features to determine semantic features of one or more candidate turns for continuing a platform dialog according to one embodiment of the present invention.

FIG. 4 is a flowchart of a method for using evocation features to determine 240 semantic features of one or more candidate turns for continuing a platform dialog according to one embodiment of the present invention. In an embodiment, the steps depicted in the method shown in FIG. 4 are implemented by instructions for performing the described actions embodied or stored within a computer readable medium, e.g., memory 140, which are executable by a processor 110. Those of skill in the art will recognize that the method may be implemented in embodiments of hardware and/or software or combinations thereof. Moreover, other embodiments can include different and/or additional steps than the ones shown in FIG. 4.

In a coherent dialog, reference to a first concept, or topic, may evoke a response referencing a second concept, or topic, related to the first concept. Evocation features identify relationships between two or more topics where referencing a first topic produces a response referencing a second topic. To identify evocation features, the semantic analysis module 146 initially generates evocation relationships from datasets included in the dialog store 142 or accessed via the communication module 150. Generating evocation relationships from datasets allows the semantic analysis module to identify evocation relationships from a wide range of words. In an embodiment, multiple datasets are used to generate evocation relationships used to evaluate a candidate turn.

The semantic analysis module 146 access 410 one or more datasets including labeled data from the dialog store 142 or using the communication module 150. The labeled data comprises a dataset having text data organized into one or more categories and/or sub-categories. For example, the labeled data includes a plurality of question and answer pairs organized into categories based on title, content or other characteristics of the question and answer pairs, such as data from "YAHOO® Answers," the "Open Directory Project," Wikipedia or other collection of data partitioned into one or more categories and/or subcategories. In an embodiment, the semantic analysis module 146 accesses 410 labeled data received from human annotators completing a pattern which generates a common knowledge sentence, such as data stored in the "OpenMind Indoor Common Sense" project, described in "Common Sense Data Acquisition for Indoor Mobile Robots" by R. Gupta et al. in Nineteenth National Conference on Artificial Intelligence, Jul. 25-29, 2004, which is incorporated by reference herein in its entirety. For example, the structured data includes sentences having the form "In conversation about subject, one might discuss an object," allowing the semantic analysis module to retrieve 420 the data pair (subject, object) from the sentence structure. Pairs of data having an evocation relationship are retrieved 420 from the labeled data by the semantic analysis module 146.

To obtain additional evocation relationships, the semantic analysis module 146 also accesses 430 one or more synsets stored in the dialog store 142 or accesses 430 a remote storage location including one or more synsets using the communication module 150. A synset comprises a group of synonyms and identifies one or more semantic relationships between the synonyms. In an embodiment, a synset also includes a short, general definition of one or more of the synonyms. For example, an example synset associated with the word "flaw" comprises [defect, fault, flaw]. One or more evocation relationships are determined 440 from the synset by the semantic analysis module 146; using the example synset associated with "flaw" described above, the following evocation relationships are determined 440: {(defect, fault), (defect, flaw), (fault, flaw), (fault, defect), (flaw, defect), (flaw, fault)}. In an embodiment, the evocation relationships are determined 440 using the most frequently used synonym included in a synset.

In an embodiment, the semantic analysis module 146 also determines 450 additional evocation relationships by identifying word senses in one or more text datasets and grouping words based on distributional similarity. For example, the semantic analysis module 146 performs clustering by committee, to generate clusters of words from a dataset included in the dialog store 142 or accessed via the communication device 150 as described in "Clustering by Committee" by P. A. Pantel (Ph.D. thesis, Department of Computing Science, University of Alberta, Edmonton, Canada), which is incorporated by reference herein in its entirety, or a similar process for clustering data and knowledge collection. Evocation relationships are determined 450 from the clusters by pairing a word included in a cluster with other words included in the same cluster to generate one or more word pairs.

By using evocation relationships from labeled data, synsets and/or clustered data, the semantic analysis module 146 identifies 460 one or more evocation relationships between a candidate turn and one or more turns from the platform dialog. In an embodiment, the semantic analysis module 146 identifies 460 an evocation degree of a candidate turn describing the percentage of words in the candidate turn that can be evoked from one or more words in one or more turns of the platform dialog. For example, the evocation degree of a candidate turn is a ratio of the number of words in the candidate turn that can be evoked from a turn in the platform dialog to the total number of words in the candidate turn. A higher evocation degree indicates that a candidate turn includes topics which are likely to be evoked from a turn in the platform dialog, indicating that addition of the candidate turn to the platform dialog will not impair the coherence of the platform dialog.

Figure 5:
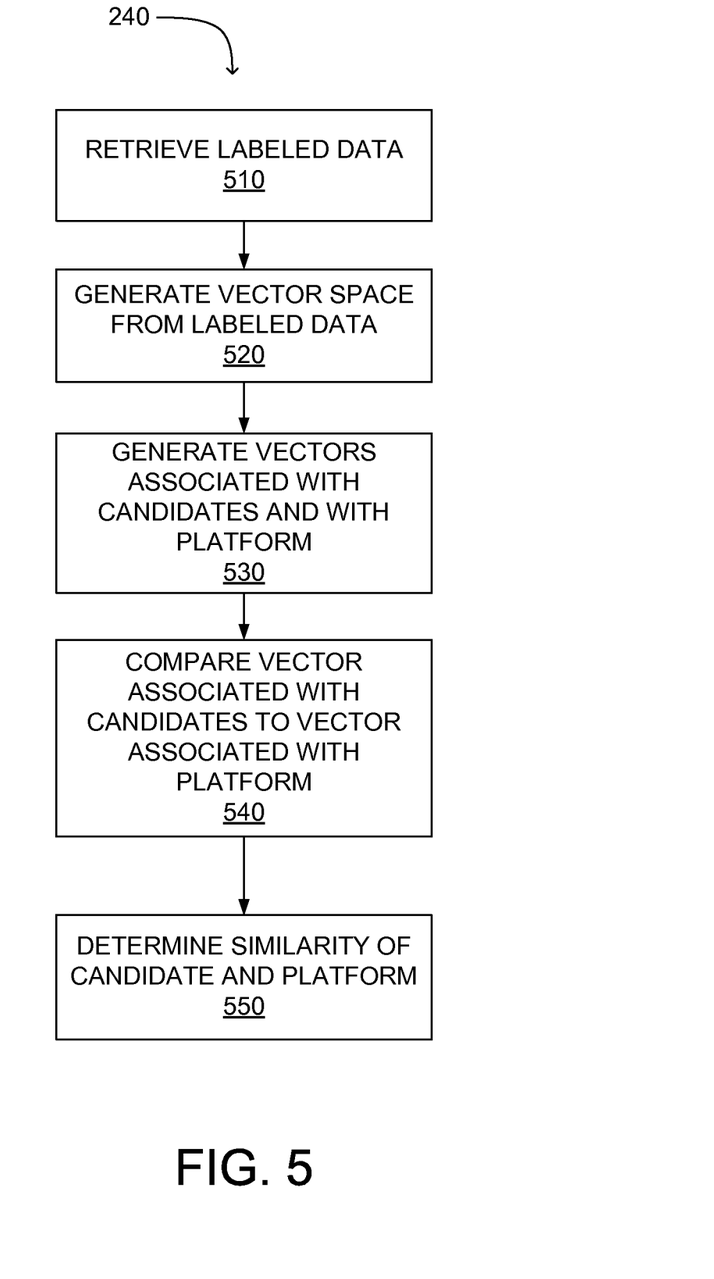
FIG. 5 is a flowchart of a method for using concept vector analysis to determine semantic features of one or more candidate turns for continuing a platform dialog according to one embodiment of the present invention.

FIG. 5 is a flowchart of a method for using concept vector analysis to determine 240 semantic features of one or more candidate turns for continuing a platform dialog according to one embodiment of the present invention. In an embodiment, the steps depicted in the method shown in FIG. 5 are implemented by instructions for performing the described actions embodied or stored within a computer readable medium, e.g., memory 140, which are executable by a processor 110. Those of skill in the art will recognize that the method may be implemented in embodiments of hardware and/or software or combinations thereof. Moreover, other embodiments can include different and/or additional steps than the ones shown in FIG. 5.

Concept vector analysis associates a set of topics, or concepts, to a text, such as a candidate turn or a platform dialog, in a concept vector space determined from a knowledge source. Comparison of a vector associated with the platform dialog to a vector associated with a candidate turn allows determination of the similarity in subject matter between the candidate turn and the dialog. One or more concept vector spaces are determined from one or more categorized data sources stored in the dialog store 142 or accessed via the communication module 150.

Initially, the semantic analysis module 146 retrieves 510 labeled data from the dialog store 142 or using the communication module 150. The labeled data includes text data organized into one or more categories and/or sub-categories. For example, the labeled data comprises a plurality of question and answer pairs organized into categories based on title, content or other characteristics of the question and answer pairs. Examples of labeled datasets include "YAHOO® Answers," the "Open Directory Project," Wikipedia or other collections of data partitioned into one or more categories and/or subcategories. The labeled data is used by the semantic analysis module to generate 520 a vector space from which a concept vector associated with the platform and a concept vector associated with each candidate turn are generated 520.

In one embodiment, the vector associated with the dialog and the vectors associated with each candidate turn are generated 520 by extracting a predetermined number of words, such as K words, from a plurality of categories or subcategories in the labeled data which comprise a term frequency-inverse document frequency (TF-IDF) summary for a category or a subcategory. For example, K words are selected from a first category so that the K selected words comprise the TF-IDF summary for the first category. To generate 520 the concept vector associated with the platform, the cosine similarity between each TF-IDF summary and the platform is calculated, producing a vector of cosine similarity values indicating the similarity of the platform to each TF-IDF summary. The vector of cosine similarity values is normalized to sum to one, and each normalized cosine similarity value in the normalized vector of cosine similarity values is compared to a threshold value and discarded if the normalized cosine similarity value falls below the threshold value. In an embodiment, the threshold value is a value greater than the average value of the normalized vector of cosine similarity values to remove outliers where the platform has a uniformly low similarity to many concepts.

Similarly, to generate 520 the concept vector associated with a candidate turn, the cosine similarity between each TF-IDF summary and the candidate turn is calculated to produce a vector of cosine similarity values indicating the similarity of the candidate turn to each TF-IDF summary. The vector of cosine similarity values is normalized to sum to one, and each normalized cosine similarity value in the normalized vector of cosine similarity values is compared to a threshold value and discarded if the normalized cosine similarity value falls below the threshold value. In an embodiment, the threshold value is a value greater than the average value of the normalized vector of cosine similarity values to remove outliers where the candidate turn has a uniformly low similarity to many concepts.

Alternatively, the vectors associated with each candidate turn are generated 520 using explicit semantic analysis where lists of words which are highly discriminative for each topic, or concept, are constructed. The platform dialog is compared to the lists of words associated with each topic to determine the list of words, and the corresponding topic or topics, most closely matching the platform dialog. Similarly, the list, or lists, of words most closely matching a candidate turn is identified to determine the topic, or topics, associated with the candidate turn. Application of explicit semantic analysis to generate a concept vector is further described in "Computing Semantic Relatedness Using Wikipedia-Based Explicit Semantic Analysis," by E. Gabrilovich et al. in Proceedings of International Joint Conference on Artificial Intelligence, pages 1606-1611, January 2007, which is incorporated by reference herein in its entirety. By associating a concept vector with the platform and associating a concept vector with each candidate turn, the semantic analysis module 146 identifies one or more concepts, or topics, associated with the platform and each candidate turn.

To determine the similarity of a candidate turn to the platform, the semantic analysis module 146 compares 540 the concept vectors associated with one or more candidate turn to the concept vector associated with the platform. As the concept vectors identify topics, or concepts, associated with the platform and with the candidate turns, this comparison determines whether one or more candidate turns are associated with similar topics or concepts as the platform. Based on the comparison of candidate turns to platform, the semantic analysis module 146 determines 550 a similarity metric indicating the degree of concept, or topic, overlap between a candidate turn and the platform. A higher similarity metric indicates that a candidate turn and the platform are associated with similar topics, while a lower similarity metric indicates that a candidate turn and the platform are associated with different topics.

To illustrate concept vector analysis, an example platform dialog is produced below in Table 1, which shows turns from an example platform dialog between entity A and entity B.

TABLE 1

Example Platform Dialog

| Entity | Turn |
| --- | --- |
| A: | Do you play computer games? |
| B: | Oh, yes, all the time. |
| A: | All the time? |
| B: | At night, you know, after I get my kids to bed, and have a few minutes to just vegetate |
| A: | What kind of games to you play |

After generating 520 a vector space from labeled data, the semantic analysis module generates 530 a concept vector associated with the platform dialog identifying topics or concepts associated with the platform. In the example shown in Table 1, the semantic analysis module associates the concept vector [Computers&Internet, ComputerGames, Movies, Sports&Recreation] with the platform dialog shown in Table 1. The semantic analysis module 146 then generates 530 a concept vector associated with a candidate turn being considered for inclusion in the platform dialog. For example, a concept vector is generated 530 for the example candidate turn "Well, like, I mainly go onto gaming websites." In an embodiment, the example candidate turn results in a concept vector of [Computers&Internet, ComputerGames, InternetGambling]. The concept vector associated with the platform dialog and the concept vector associated with the example candidate turn are compared 540 and similar topics in both concept vectors, such as "Computers&Internet" and "ComputerGames," are identified to determine 550 the similarity of the candidate turn and the platform dialog.

Figure 6:
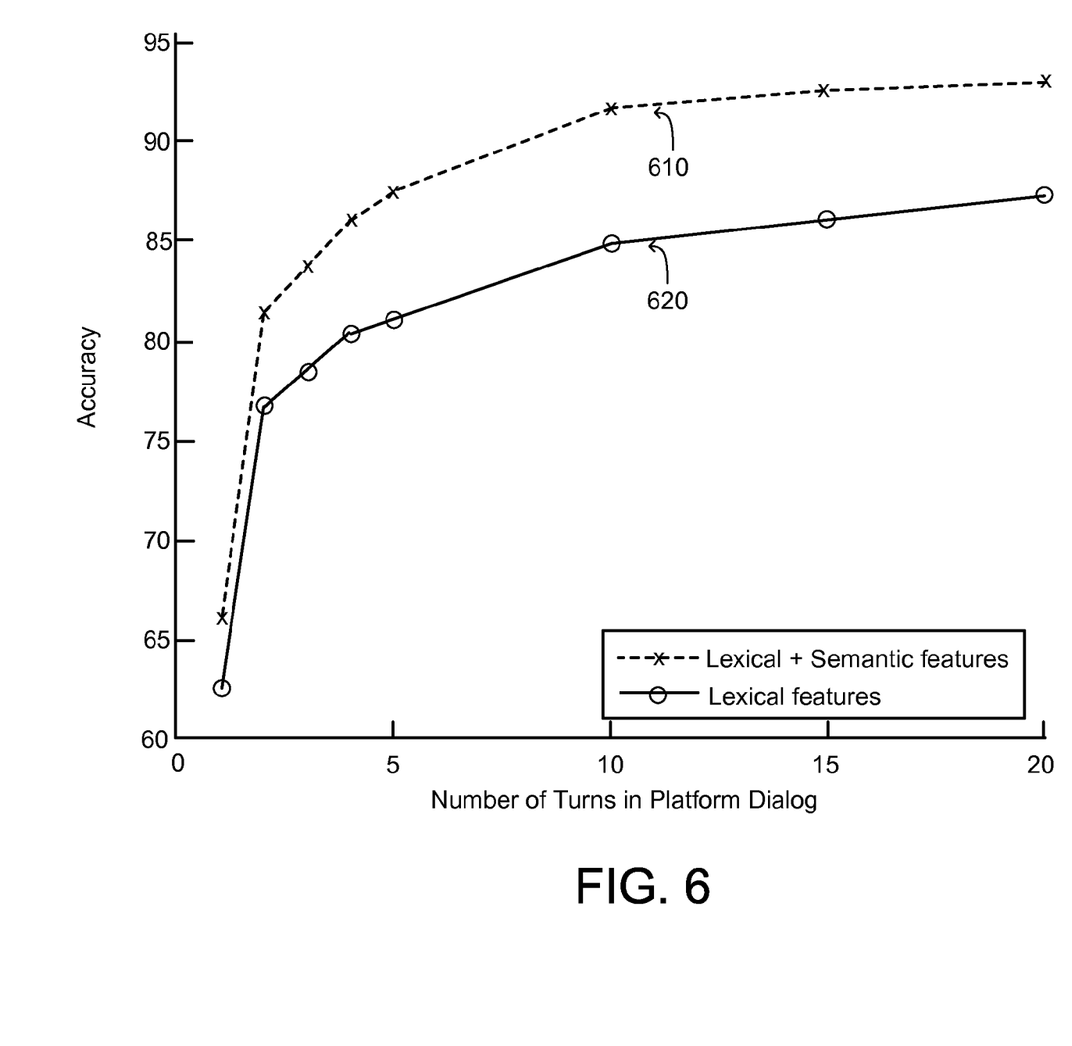
FIG. 6 is an illustration of dialog prediction accuracy using lexical and semantic features according to one embodiment of the present invention.

FIG. 6 is an illustration of the accuracy of dialog prediction using lexical and semantic features according to one embodiment of the present invention. In FIG. 6, the percentage of candidate turns selected from one or more stored dialogs accurately included in the platform dialog is shown relative to the number of turns in the platform dialog. While selecting a candidate turn using lexical features 620 results in accurate selection of the candidate turn approximately 88% of the time, selecting a candidate turn using both lexical and semantic features 610 results in accurate selection of the candidate turn approximately 93% of the time. Also, FIG. 6 shows improved accuracy in candidate turn selection as the number of turns comprising the platform dialog increases, allowing the semantic analysis module 146 to more accurately determine topics associated with the platform dialog.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-implemented method for identifying a candidate turn for addition to a platform dialog, the method comprising the steps of:
    determining one or more lexical features of each candidate turn in a set of candidate turns relative to one or more turns included in the platform dialog, the platform dialog comprising a plurality of turns representing a current conversation;
    determining one or more semantic features associated with each candidate turn and associated with the platform dialog, a semantic feature associated with a candidate turn identifying one or more topics associated with the candidate turn and a semantic feature associated with the platform dialog identifying one or more topics associated with the platform dialog;
    determining, for each candidate turn, a corresponding measure of similarity of the one or more lexical features and semantic features of the candidate turn and one or more lexical features and semantic features of the platform dialog;
    ranking the set of candidate turns using a linear ranker configured to, for each pair of candidate turns, compare the determined measure of similarity corresponding to a first of the pair of candidate turns and the determined measure of similarity corresponding to a second of the pair of candidate turns, the linear ranker configured to further rank the candidate turns based on a weighting vector updated in response to and based on a result of each comparison;
    adding a candidate turn having a highest ranking to the platform dialog; and
    presenting, via a hardware display, the added candidate turn to a conversation participant.

2. The computer-implemented method of claim 1, wherein determining one or more lexical features of each candidate turn relative to one or more turns included in the platform dialog comprises the steps of:
    determining overlapping lexical features between a candidate turn and one or more turns included in the platform dialog; and
    identifying one or more transition features between the candidate turn and one or more turns included in the platform dialog.

3. The computer-implemented method of claim 2, wherein determining overlapping lexical features between the candidate turn and one or more turns included in the platform dialog comprises the step of:
    determining a percentage of lexical features included in the candidate turn and also included in one or more turns included in the platform dialog.

4. The computer-implemented method of claim 3, wherein the overlapping lexical features comprise at least one of: tokens, stemmed tokens, bigrams or stemmed bigrams.

5. The computer-implemented method of claim 2, wherein determining overlapping lexical features between the candidate turn and one or more turns included in the platform dialog comprises:
    determining a temporal proximity of a turn included in the platform to the candidate turn; and
    weighting an influence of the turn included in the platform so that a turn included in the platform temporally near the candidate turn has a larger weight.

6. The computer-implemented method of claim 2, wherein identifying one or more transition features between the candidate turn and one or more turns included in the platform dialog comprises the steps of:
    generating a plurality of bigrams pairing a feature from the candidate turn with a feature from a turn included in the platform dialog; and
    determining whether a bigram includes a pairing of a feature from the candidate turn with a feature from a turn included in the platform dialog associated with incoherence.

7. The computer-implemented method of claim 1, wherein determining one or more semantic features associated with each candidate turn and associated with the platform dialog comprises the step of:
    determining evocation relationships between the candidate turn and one or more turns in the platform dialog, an evocation relationship identifying a topic associated with the candidate turn that is evoked from a topic associated with a turn in the platform dialog.

8. The computer-implemented method of claim 7, wherein determining evocation relationships between the candidate turn and one or more turns in the platform dialog comprises the steps of:
    extracting a set of evocation relationship pairs from structured data, one or more synsets or clustered data, each evocation relationship including a first word and a second word which is evoked from the first word; and determining whether a word from the turn in the platform dialog is the first word in an evocation relationship pair and a word from the candidate turn is the second word in the evocation relationship pair.

9. The computer-implemented method of claim 1, wherein determining one or more semantic features associated with each candidate turn and associated with the platform dialog comprises the steps of:

generating a platform concept vector associated with the platform dialog, the platform concept vector associating one or more topics with the platform dialog based on content of the platform dialog;

generating a candidate concept vector associated with the candidate turn, the candidate concept vector associating one or more topics with the candidate turn based on content of the candidate turn; and comparing the platform concept vector to the candidate concept vector to generate a similarity metric indicating a number of topics overlapping between the platform dialog and the candidate turn.

10. The computer-implemented method of claim 9, wherein generating the candidate concept vector associated with the candidate turn comprises the steps of:

determining one or more topics from labeled data, the labeled data including text data organized into one or more categories;

comparing the candidate turn to the one or more topics from the labeled data to generate one or more similarity values between the candidate turn and each topic; and storing a set of topics from the labeled data associated with a set of similarity values exceeding a threshold value.

11. The computer-implemented method of claim 1, wherein determining one or more semantic features associated with each candidate turn and associated with the platform dialog comprises the steps of:

determining evocation relationships between the candidate turn and one or more turns in the platform dialog, an evocation relationship identifying a topic associated with the candidate turn that is evoked from a topic associated with a turn in the platform dialog;

generating a platform concept vector associated with the platform dialog, the platform concept vector associating one or more topics with the platform dialog based on content of the platform dialog;

generating a candidate concept vector associated with the candidate turn, the candidate concept vector associating one or more topics with the candidate turn based on content of the candidate turn; and comparing the platform concept vector to the candidate concept vector to generate a similarity metric indicating a number of topics overlapping between the platform dialog and the candidate turn.

12. The computer-implemented method of claim 1, wherein the linear ranker is configured to, for each pair of candidate turns:

multiply the determined measure of similarity corresponding to a first of the pair of candidate turns by the weighting vector to form a first weighted measure of similarity; and multiply the determined measure of similarity corresponding to a second of the pair of candidate turns by the weighting vector to form a second weighted measure of similarity;

wherein comparing the determined measures of similarity comprises comparing the first weighted measure of similarity and the second weighted measure of similarity.

13. The computer-implemented method of claim 12, wherein comparing the first weighted measure of similarity and the second weighted measure of similarity comprises subtracting the first weighted measure of similarity from the second weighted measure of similarity to produce a difference between the weighted measures of similarity.

14. The computer-implemented method of claim 13, wherein the first of the pair of candidate turns is ranked higher than the second of the pair of candidate turns responsive to the produced difference being positive, and wherein the second of the pair of candidate turns is ranked higher than the first of the pair of candidate turns responsive to the produced difference being negative.

15. A computer program product comprising a non-transitory computer readable storage medium storing computer executable code for identifying a candidate turn for addition to a platform dialog, the computer executable code performing the steps of:

determining one or more lexical features of each candidate turn in a set of candidate turns relative to one or more turns included in the platform dialog, the platform dialog comprising a plurality of turns representing a current conversation;

determining one or more semantic features associated with each candidate turn and associated with the platform dialog, a semantic feature associated with a candidate turn identifying one or more topics associated with the candidate turn and a semantic feature associated with the platform dialog identifying one or more topics associated with the platform dialog;

determining, for each candidate turn, a corresponding measure of similarity of the one or more lexical features and semantic features of the candidate turn and one or more lexical features and semantic features of the platform dialog;

ranking the set of candidate turns using a linear ranker configured to, for each pair of candidate turns, compare the determined measure of similarity corresponding to a first of the pair of candidate turns and the determined measure of similarity corresponding to a second of the pair of candidate turns, the linear ranker configured to further rank the candidate turns based on a weighting vector updated in response to and based on a result of each comparison;

adding a candidate turn having a highest ranking to the platform dialog; and presenting, via a hardware display, the added candidate turn to a conversation participant.

16. The computer program product of claim 15, wherein determining one or more lexical features of each candidate turn relative to one or more turns included in the platform dialog comprises the steps of:

determining overlapping lexical features between a candidate turn and one or more turns included in the platform dialog; and identifying one or more transition features between the candidate turn and one or more turns included in the platform dialog.

17. The computer program product of claim 16, wherein determining overlapping lexical features between the candidate turn and one or more turns included in the platform dialog comprises the step of:

determining a percentage of lexical features included in the candidate turn and also included in one or more turns included in the platform dialog.

18. The computer program product of claim 17, wherein the overlapping lexical features comprise at least one of: tokens, stemmed tokens, bigrams or stemmed bigrams.

19. The computer program product of claim 16, wherein determining overlapping lexical features between the candidate turn and one or more turns included in the platform dialog comprises:
    determining a temporal proximity of a turn included in the platform to the candidate turn; and
    weighting an influence of the turn included in the platform so that a turn included in the platform temporally near the candidate turn has a larger weight.

20. The computer program product of claim 16, wherein identifying one or more transition features between the candidate turn and one or more turns included in the platform dialog comprises the steps of:
    generating a plurality of bigrams pairing a feature from the candidate turn with a feature from a turn included in the platform dialog; and
    determining whether a bigram includes a pairing of a feature from the candidate turn with a feature from a turn included in the platform dialog associated with incoherence.

21. The computer program product of claim 15, wherein determining one or more semantic features associated with each candidate turn and associated with the platform dialog comprises the step of:
    determining evocation relationships between the candidate turn and one or more turns in the platform dialog, an evocation relationship identifying a topic associated with the candidate turn that is evoked from a topic associated with a turn in the platform dialog.

22. The computer program product of claim 21, wherein determining evocation relationships between the candidate turn and one or more turns in the platform dialog comprises the steps of:
    extracting a set of evocation relationship pairs from structured data, one or more synsets or clustered data, each evocation relationship including a first word and a second word which is evoked from the first word; and
    determining whether a word from the turn in the platform dialog is the first word in an evocation relationship pair and a word from the candidate turn is the second word in the evocation relationship pair.

23. The computer program product of claim 15, wherein determining one or more semantic features associated with each candidate turn and associated with the platform dialog comprises the steps of:
    generating a platform concept vector associated with the platform dialog, the platform concept vector associating one or more topics with the platform dialog based on content of the platform dialog;
    generating a candidate concept vector associated with the candidate turn, the candidate concept vector associating one or more topics with the candidate turn based on content of the candidate turn; and
    comparing the platform concept vector to the candidate concept vector to generate a similarity metric indicating a number of topics overlapping between the platform dialog and the candidate turn.

24. The computer program product of claim 23, wherein generating the candidate concept vector associated with the candidate turn comprises the steps of:
    determining one or more topics from labeled data, the labeled data including text data organized into one or more categories;
    comparing the candidate turn to the one or more topics from the labeled data to generate one or more similarity values between the candidate turn and each topic; and
    storing a set of topics from the labeled data associated with a set of similarity values exceeding a threshold value.

25. The computer program product of claim 15, wherein determining one or more semantic features associated with each candidate turn and associated with the platform dialog comprises the steps of:
    determining evocation relationships between the candidate turn and one or more turns in the platform dialog, an evocation relationship identifying a topic associated with the candidate turn that is evoked from a topic associated with a turn in the platform dialog;
    generating a platform concept vector associated with the platform dialog, the platform concept vector associating one or more topics with the platform dialog based on content of the platform dialog;
    generating a candidate concept vector associated with the candidate turn, the candidate concept vector associating one or more topics with the candidate turn based on content of the candidate turn; and
    comparing the platform concept vector to the candidate concept vector to generate a similarity metric indicating a number of topics overlapping between the platform dialog and the candidate turn.

26. A computing system for identifying a candidate turn for addition to a platform dialog comprising:
    a dialog store including the platform dialog and one or more stored dialogs from which a set of candidate turns are generated, the platform dialog comprising a plurality of turns representing a current conversation;
    a lexical analysis module coupled to the dialog store, the lexical analysis module configured to determine one or more lexical features of each candidate turn relative to one or more turns included in the platform dialog;
    a semantic analysis module coupled to the dialog store, the semantic analysis module configured to determine one or more semantic features associated with each candidate turn and one or more semantic features associated with the platform dialog, a semantic feature associated with a candidate turn identifying one or more topics associated with the candidate turn and a semantic feature associated with the platform dialog identifying one or more topics associated with the platform dialog;
    a comparison function configured to determine, for each candidate turn, a corresponding measure of similarity of the one or more lexical features and semantic features of the candidate turn and one or more lexical features and semantic features of the platform dialog;
    a dialog prediction module coupled to the dialog store, the lexical analysis module and the semantic analysis module, the dialog prediction module configured to linearly rank the set of candidate turns by comparing, for each pair of candidate turns, the determined measure of similarity corresponding to a first of the pair of candidate turns and the determined measure of similarity corresponding to a second of the pair of candidate turns, the linear ranker configured to further rank the candidate turns based on a weighting vector updated in response to and based on a result of each comparison, the dialog prediction module further configured to add a candidate turn having a highest ranking to the platform dialog; and a hardware display configured to present the added candidate turn to a conversation participant.

27. The system of claim 26, wherein the semantic analysis module is further configured to:
   determine evocation relationships between the candidate turn and one or more turns in the platform dialog, an evocation relationship identifying a topic associated with the candidate turn that is evoked from a topic associated with a turn in the platform dialog.

28. The system of claim 26, wherein the semantic analysis module is further configured to:
   generate a platform concept vector associated with the platform dialog, the platform concept vector associating one or more topics with the platform dialog based on content of the platform dialog;
   generate a candidate concept vector associated with the candidate turn, the candidate concept vector associating one or more topics with the candidate turn based on content of the candidate turn; and
   compare the platform concept vector to the candidate concept vector to generate a similarity metric indicating a number of topics overlapping between the platform dialog and the candidate turn.

29. The system of claim 28 wherein the semantic analysis module is further configured to:
   determine evocation relationships between the candidate turn and one or more turns in the platform dialog, an evocation relationship identifying a topic associated with the candidate turn that is evoked from a topic associated with a turn in the platform dialog.

30. The system of claim 26, wherein the lexical analysis module is further configured to:
   determine overlapping lexical features between a candidate turn and one or more turns included in the platform dialog; and
   identify one or more transition features between the candidate turn and one or more turns included in the platform dialog.

* * * * *